Sept. 15, 1936.    B. DICK    2,054,653
BLEEDING MEANS FOR FLUID PRESSURE MECHANISM
Filed April 20, 1935
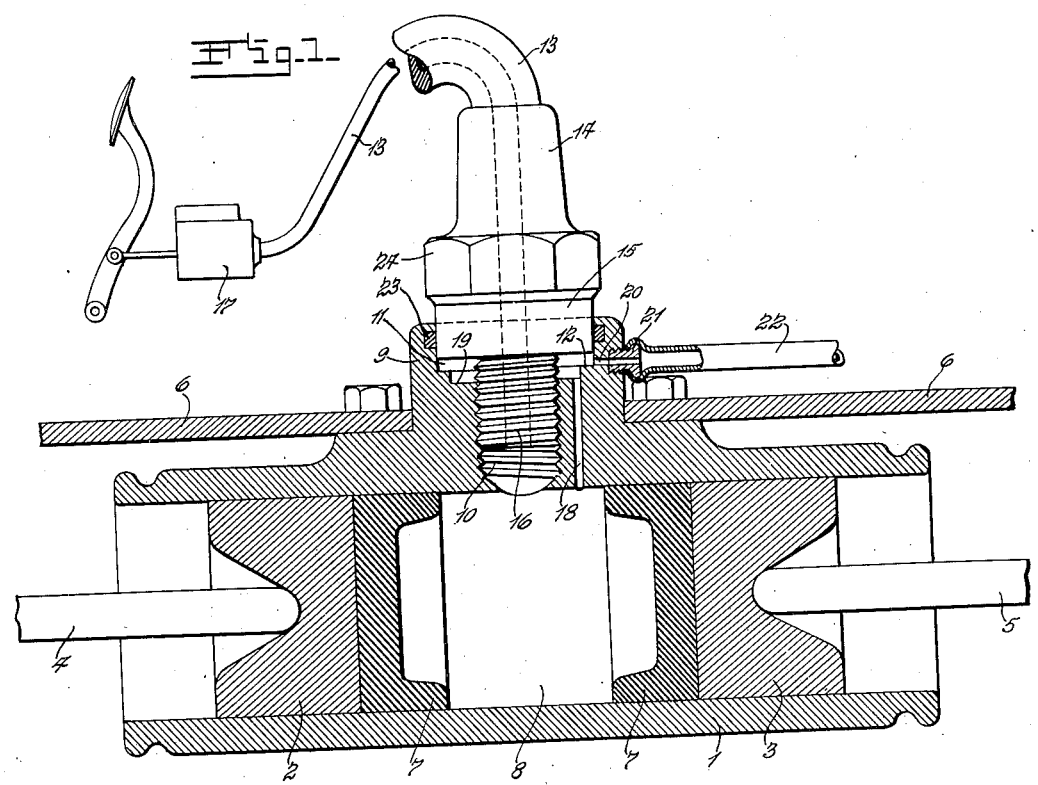
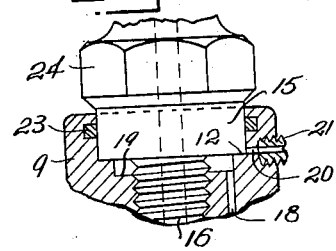
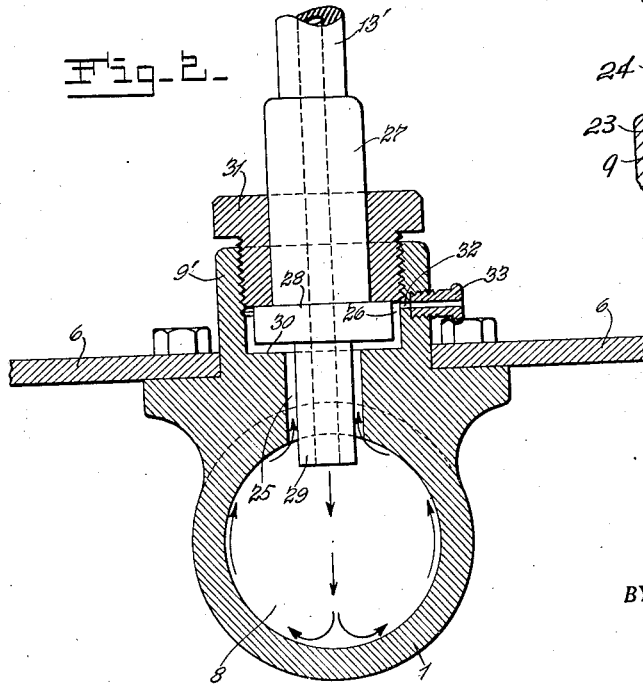
INVENTOR.
BURNS DICK
BY E. E. Huffman
ATTORNEY.

Patented Sept. 15, 1936

2,054,653

UNITED STATES PATENT OFFICE 2,054,653

BLEEDING MEANS FOR FLUID PRESSURE MECHANISM

Burns Dick, Ferguson, Mo., assignor to Wagner Electric Corporation, St. Louis, Mo., a corporation of Delaware Application April 20, 1935, Serial No. 17,375

6 Claims. (Cl. 60—54.6)

My invention relates to improvements in fluid pressure systems and more particularly to an improved connecting means between the fluid supply conduit and the wheel cylinder of a hydraulic brake actuating system.

One of the objects of my invention is to so combine a bleeder passage and a supply conduit connecting means for a fluid receiving chamber that the bleeder passage may be controlled by the connecting means.

Another object of my invention is to so construct the connecting means between a supply conduit and a fluid receiving chamber that a portion thereof forms a valve means for the bleeder passage of the chamber.

Other objects of my invention will become apparent from the following description taken in connection with the accompanying drawing, showing two embodiments thereof, in which Figure 1 is a partial cross-sectional view of a supply conduit and the wheel cylinder assembly of a hydraulic brake system in which my invention is embodied; Figure 1A is a partial view similar to Figure 1 showing the parts in another relation; and Figure 2 is a partial cross-sectional view of a modified construction.

Although I have chosen a portion of a hydraulic brake actuating system to illustrate my invention, it is to be understood that it may be embodied in other types of fluid systems.

Referring to Figures 1 and 1A in detail, the numeral 1 indicates the cylinder of a hydraulic brake actuating device in which is positioned a pair of oppositely movable pistons 2 and 3 adapted to actuate a pair of brake shoes 4 and 5, a top view of the ends of the shoe webs only being shown. The cylinder is secured to the fixed support or backing plate 6 of the brake in a well-known manner. The pistons are provided with the usual packing cups 7 and the pistons and cylinder wall form a chamber 8 for receiving liquid under pressure whereby the pistons may be moved in opposite directions to actuate the brake.

The cylinder 1 is provided with an integral extension 9 which projects through a suitable opening in the backing plate 6. This extension has formed therein a threaded passage 10 one end of which opens into the chamber and the other end of which opens into a cylindrical recess 11 in the end of the extension, thereby forming an annular shoulder 12.

The liquid supply conduit 13 for conveying liquid under pressure to the cylinder, has secured thereto a terminal member 14 provided with a cylindrical portion 15 and a threaded extension 16 which is adapted to cooperate with the threaded passage 10. When the extension is in threaded relation to the threads of passage 10, the cylindrical portion 15 is received in recess 11, and when the terminal member is screwed in tightly, the end surface of the cylindrical portion engages, and has a liquid-tight fit, with the shoulder 12, thereby insuring a liquid-tight joint as shown in Figure 1A. The supply conduit 13 is connected with the master cylinder device 17 of the braking system for creating pressure on the liquid to thereby move the brake actuating pistons in opposite directions.

In hydraulic brake actuating systems it is necessary to provide means for bleeding the systems to eliminate any air therein. This bleeding operation must be performed when the system is initially filled with fluid and possibly also during use of the same if air should by chance be drawn into the system. In accordance with my invention I control this bleeding passage by means of the terminal member of the fluid supply conduit.

A passage 18 is formed in the extension 9, the inner end of which is in communication with chamber 8 and the outer end of which opens into a recess 11 through an annular recess 19. Communication from the annular recess 11 to the exterior is provided by a passage 20, the outer end of which receives a nipple 21 for conveniently attaching a rubber tube 22 for conveying the liquid to a suitable receptacle when the system is bled. The flow of liquid from passage 18 to passage 20 is controlled by engaging and disengaging the end surface of the cylindrical portion 15 on the conduit terminal with shoulder 12.

In initially filling the system with a suitable operating liquid the master cylinder device 17 is first filled with liquid which is then forced through the system by operating the master cylinder as a pump in a well-known manner. When the terminal member is in the position shown in Figure 1, liquid forced through the system by the master cylinder device will flow into chamber 8 from the supply conduit through passage 10 and then out of the chamber to the exterior through passage 18, recess 11, and passage 20, as indicated by the arrow. When all the air has been eliminated from the system it is only necessary, in order to prevent the flow of fluid from the chamber to the exterior, to screw up the supply conduit terminal member by means of the wrench-receiving portion 24. This will place the end of the cylindrical portion 15 in sealing engagement with shoulder 12 as shown in Figure 1A. Thus the fluid supply conduit will be in fluid-tight engagement with passage 19 and communication between passages 18 and 20 will be cut off.

When it is desired to bleed the system any time after the system has been filled with liquid, it will only be necessary to unscrew the conduit terminal member sufficiently to disengage the end surface of the cylindrical portion 15 from the shoulder 18, thereby placing passage 18 in communication with passage 20. In order to decrease the possibility of leakage between the cylindrical portion 15 and the wall of the recess 11 when the terminal member is unscrewed, a rubber packing ring 23 may be employed as shown.

In Figure 2 I have shown a modification of the structure of Figure 1. The cylinder 1 is similar to that previously described and is provided with an integral extension 9' which extends through an opening in the backing plate 6. The cylinder wall is provided with a passage 25 which communicates with a cylindrical chamber 26 in the extension 9', this chamber being of larger diameter than passage 25. The supply conduit 13' carries a terminal member 27 which is provided with an annular shoulder 28 and a hollow extension 29 in communication with the conduit. The diameter of the annular shoulder 28 is slightly less than the diameter of the chamber 26 and is adapted to engage the annular shoulder 30 formed by passage 25 entering the chamber 26. The extension 29 of the terminal member is of smaller external diameter than the diameter of passage 25 and is adapted to be received in passage 25. The length of the extension 29 is such that it will extend into the interior of chamber 8 of the cylinder. The wall of chamber 26 is threaded for cooperation with a threaded nut 31 surrounding the terminal member 27 whereby the shoulder 28 may be forced against shoulder 30 to thereby seal the connection between the conduit terminal and the cylinder wall. The extension 9' is provided with a passage 32 for placing chamber 26 in communication with the exterior. The end of passage 32 carries a suitable nipple member 33 for receiving the rubber tube.

In the modification, when it is desired to bleed the system the nut 31 is unscrewed to the position shown, thereby disengaging shoulders 28 and 30. Under these conditions liquid from the master cylinder may be forced through conduit 13' and the hollow extension 29 of the terminal member into chamber 8 and then out through passages 25, 26, and 32. When the bleeding operation is completed, the terminal member is sealed to the cylinder wall by screwing down nut 31, thereby causing shoulder 28 to sealingly engage shoulder 30.

The construction shown in Figure 2 very efficiently eliminates air from chamber 8 during the bleeding operation. The liquid under pressure entering chamber 8 through extension 29 will flow across the cylinder and impinge on the opposite wall where it will divide and flow back along the walls of the cylinder to passage 25, as indicated by the arrows. Thus any air along the cylinder walls will be picked up by the liquid.

By means of my invention the liquid and any air in the liquid is conducted into and out of the cylinder by independent passages, thus insuring that liquid will pass through the cylinder during the bleeding operation. The bleeder passage—the passage between the cylinder and the exterior—is opened and closed by means of the conduit terminal, thus eliminating the necessity for using a separate valve for the bleeder passage. A simple twist of the supply conduit connecting means is all that is necessary to control the bleeder passage.

Having fully described my invention, what I claim as new and desire to secure by Letters Patent of the United States is:

1. In a fluid supply and bleeding means for a fluid system, a fluid receiving chamber having an opening in its wall, a supply conduit, means removably connecting the supply conduit in fluid-tight relation to the chamber opening whereby fluid will flow directly into the chamber, means forming a bleed passage between the chamber and the exterior for permitting fluid to flow from the chamber independently of the path of fluid flow from the supply conduit, and means for controlling the passage by the connecting means, said passage being closed when the connecting means is in a position to maintain the conduit in fluid-tight relation with the chamber and open when the connecting means is in a position where the conduit is connected to the chamber but not in fluid-tight relation.

2. In a fluid supply and bleeding means for a fluid system, a fluid receiving chamber having an opening in its wall, a supply conduit, means comprising cooperating screw-threaded elements carried by the chamber wall and the conduit for removably connecting the conduit in fluid-tight relation to the chamber opening whereby fluid will flow directly into the chamber, means forming a bleed passage between the chamber and the exterior and independent of the path of fluid flow from the supply conduit to the chamber, and means comprising a portion of said connecting means for controlling said passage whereby said passage will be closed when the threaded elements are in a position to maintain the conduit in fluid-tight relation with the chamber and open when the threaded elements are in another position where the conduit is maintained connected to the chamber but not in fluid-tight relation.

3. In a fluid supply and bleeding means for a fluid system, a fluid receiving chamber having an opening in its wall, a fluid supply conduit, means for connecting the conduit to the chamber and for sealing the conduit to the chamber opening, means forming a bleed passage between the chamber and the exterior and independent of the path of fluid flow from the supply conduit to the chamber, and means carried by the connecting means for closing said passage when the connecting means is in a position for sealing the conduit to the chamber opening and for opening the passage when the connecting means is in a position in which the conduit is unsealed with respect to the chamber.

4. In a fluid supply and bleeding means for a fluid system, a fluid receiving chamber having an opening in its wall, a fluid supply conduit provided with a shoulder, means for attaching said conduit to the chamber so that said shoulder will be in sealing engagement with the chamber wall, and means forming a bleed passage between the chamber and the exterior and independent of the path of fluid flow from the supply conduit to the chamber, said passage being closed when the shoulder is in sealing engagement with the chamber wall and open when the shoulder is moved to a disengaged position.

5. In a fluid system, a fluid receiving chamber having a threaded opening in its wall and an independent bleed passage for placing the chamber in communication with the exterior, the wall of said chamber being formed with an annular surface surrounding the outer ends of the opening and the passage, and a fluid supply conduit provided with a threaded extension for cooperation with the threaded opening and with a shoulder for sealing engagement with the annular surface on the chamber wall.

6. In a fluid system, a fluid receiving chamber provided with an opening in its wall and an annular surface surrounding said opening, a fluid supply conduit provided with a hollow extension of smaller external diameter than said chamber opening and adapted to extend through said opening into the chamber, said conduit also being provided with a shoulder for engaging the annular surface, means for removably securing the conduit to the chamber wall whereby the shoulder and annular surface will be in sealing engagement, and means permitting communication between the chamber and the exterior when the shoulder and annular surface are moved out of sealing engagement.

BURNS DICK.